US006704638B2

(12) United States Patent
Livshiz et al.

(10) Patent No.: US 6,704,638 B2
(45) Date of Patent: Mar. 9, 2004

(54) TORQUE ESTIMATOR FOR ENGINE RPM AND TORQUE CONTROL

(75) Inventors: Michael Livshiz, Ann Arbor, MI (US); Joseph Robert Dulzo, Novi, MI (US); Onassis Matthews, Novi, MI (US); Donovan L. Dibble, Utica, MI (US); Alfred E. Spitza, Jr., Brighton, MI (US); Scott Joseph Chynoweth, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 69 days.

(21) Appl. No.: 10/184,260

(22) Filed: Jun. 26, 2002

(65) Prior Publication Data

US 2004/0002805 A1 Jan. 1, 2004

(51) Int. Cl.[7] .......................... G06F 19/00; F02D 41/14

(52) U.S. Cl. ...................... 701/102; 73/117.3; 701/110; 701/84

(58) Field of Search ................................ 701/102, 110, 701/84, 92; 123/406.23, 406.47, 406.55, 350, 352; 73/117.3

(56) References Cited

U.S. PATENT DOCUMENTS

| | | | | | |
|---|---|---|---|---|---|
| 5,577,474 | A | * | 11/1996 | Livshiz et al. | 123/352 |
| 6,047,681 | A | * | 4/2000 | Scherer et al. | 123/406.46 |
| 6,212,945 | B1 | * | 4/2001 | Moskwa | 73/117.3 |
| 6,581,565 | B2 | * | 6/2003 | Heslop et al. | 123/406.23 |

* cited by examiner

*Primary Examiner*—Hieu T. Vo
(74) *Attorney, Agent, or Firm*—Christopher DeVries

(57) ABSTRACT

An engine toque estimator according to the invention includes a vehicle data bus that provides a plurality of engine operating inputs including at least one of engine RPM, spark and a dilution estimate. A steady state torque estimator communicates with the vehicle data bus and generates a steady state engine torque signal. A measurement model communicates with the vehicle data bus and compensates for errors associated with engine-to-engine variation. A dynamic torque estimator communicates with at least one of the vehicle data bus, the measurement model, and the steady state torque estimator and generates an actual torque signal.

18 Claims, 5 Drawing Sheets

TORQUE ESTIMATOR FOR ENGINE RPM AND TORQUE CONTROL

TECHNICAL FIELD

The present invention relates to control systems for internal combustion engines, and more particularly to control systems that estimate torque for engine RPM and torque control.

BACKGROUND OF THE INVENTION

Conventional control systems that estimate torque are predominantly designed to control shift quality. The torque-estimating accuracy of these systems is defined by the desired quality for transmission shifts. Torque estimation calculations are based on the following relationships:

$$IndTorque=k*GPO*N_{cyl}*EFF*N_{cyl\_shut}-SparkLoss$$

$$FrictionTorque=BaseTable*OTcorrector+ACCdriveFriction$$

$$Torque=IndTorque-FrictionTorque-InertiaTorque$$

where GPO is mass air flow (gram of air per cylinder), $N_{cyl}$ is a total number of cylinders in the internal combustion engine, EFF is a function of the air/fuel ratio, sparkloss is a function of RPM and GPO, and OTcorrector is an oil temperature correction.

The conventional torque estimation systems do not have direct inputs such as RPM, exhaust gas recirculation (EGR), spark, and other inputs that are needed for engine RPM and torque control (ERTC). The conventional torque estimation systems are also unable to recalculate inputs based upon requested torque or to optimize brake torque.

SUMMARY OF THE INVENTION

An engine toque estimator according to the invention includes a vehicle data bus that provides a plurality of engine operating parameters including at least one of engine RPM, spark and dilution estimate signals. A steady state torque estimator communicates with the vehicle data bus and generates a steady state engine torque signal. A measurement model communicates with the vehicle data bus and compensates for errors that are associated with engine manufacturing variations. A dynamic torque estimator communicates with at least one of the vehicle data bus, the measurement model, and the steady state torque estimator and generates an actual engine torque signal.

In other features of the invention, the engine-operating inputs further include air per cylinder, unmanaged spark, oil temperature, air/fuel ratio, barometer, enabled cylinders, and intake air estimate signals. The steady state torque estimator generates at least one of a GPO sensitivity signal, an RPM sensitivity signal, a spark sensitivity signal, and a spark squared sensitivity signal. The steady state torque estimator further generates an unmanaged engine torque signal. The steady state torque estimator outputs a steady state engine torque signal to the dynamic torque estimator. The measurement model outputs a torque estimate correction signal to the dynamic torque estimator. The dynamic torque estimator outputs the actual engine torque signal.

In yet other features, the steady state torque estimator includes a base steady state torque calculator, a steady state torque temperature corrector, and a steady state torque air/fuel corrector. The base steady state torque calculator receives the RPM, spark, unmanaged spark, dilution estimate and GPO signals from the vehicle data bus and generates the GPO, RPM, spark, and spark squared sensitivity signals. The base steady state torque calculator generates a base unmanaged engine torque signal that is output to the steady state torque temperature corrector. The steady state torque temperature corrector receives oil temperature and GPO signals from the vehicle data bus and generates a steady state unmanaged torque base signal that is output to the steady state torque air/fuel corrector. The steady state torque air/fuel corrector generates unmanaged engine torque and steady state engine torque signals.

In still other features, the base steady state torque calculator includes a torque sensitivity calculator and a final base steady state torque calculator. The torque sensitivity calculator receives the dilution estimate and RPM signals from the vehicle data bus and generates the GPO, RPM, spark, and spark squared sensitivity signals. The sensitivity signals are input to the final base steady state torque calculator. The final base steady state torque calculator receives the GPO, RPM, spark and unmanaged spark signals from the vehicle data bus. The final base steady state torque calculator calculates base steady state unmanaged torque and base steady state torque signals.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENT

The following description of the preferred embodiment(s) is merely exemplary in nature and is in no way intended to limit the invention, its application, or uses.

The present invention employs direct inputs such as RPM, a dilution estimate, spark, etc., that are required for engine RPM and torque control (ERTC). The present invention will be described with ERG position as the dilution estimate. Skilled artisans will appreciated that the dilution estimate can also be based on cam phaser position, a combination of the EGR position and cam phaser position, or any other dilution estimate can be used. The present invention can recalculate inputs based upon requested torque and can optimize brake torque. The present invention estimates torque based on torque sensitivities based on the following relationships:

$$T=f(G, r, S, E, AF, OT, BARO)=(a_s*S+a_r*r+a_G*G+a_E*E)*\eta_{AF}*\eta_{cool}$$

$$Torque=T_{warm}*\eta_{AF}*\eta_{cool}$$

$$T_{warm}=a_s*S+a_{s2}*S^2+a_r*r+a_G*G$$

$$T_{warm}=(a_s+\delta a_s*E)*S+(a_{s2}+\delta a_{s2}*E)*S^2+(a_r+\delta a_{r|E}*E)*R+(a_g+\delta a_{g|E})*G$$

where:

$a_s=a_s$(R, B, #cyl);

$a_{s2}=a_{s2}$(R, B, #cyl);

$a_r=a_r$(R, B, #cyl);

$a_g=a_g$(R, B, #cyl);

$\eta_{AF}=\eta_{AF}$(AF); and $\eta_{cool}=\eta_{cool}$ (COOL, OT, GPO).

Each open loop system has an error that is associated with engine manufacturing variations. In other words, there are manufacturing differences between the same types of engines. The present invention provides a feedback mechanism to compensate for these engine manufacturing variations. The compensation is based on a model of the torque converter:

$$T_{tc}=K^2*R^2$$

where K is a k-factor. During steady state conditions, the engine torque is equal to the torque of the torque converter.

Figure 1:
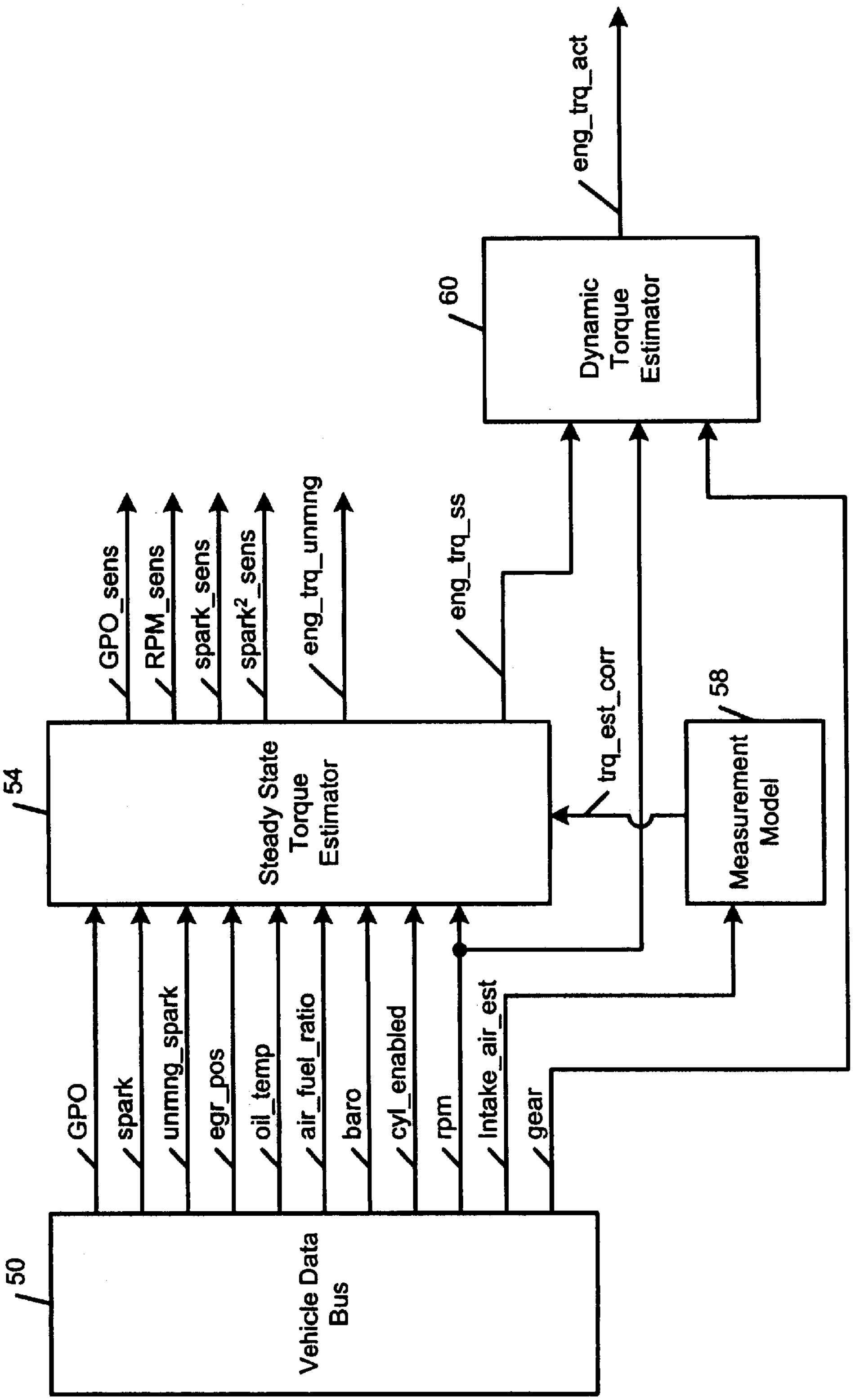
FIG. 1 is a functional block diagram of the ERTC torque estimation system that includes a steady state torque estimator, a measurement model and a dynamic torque estimator according to the present invention.

Referring now to FIG. 1, a vehicle data bus 50 outputs a plurality of engine operating signals to a steady state torque estimator 54. The engine operating signals preferably include GPO (air per cylinder), spark, unmanaged spark, EGR position, oil temperature, air/fuel ratio, barometer, enabled cylinders, and RPM signals. The vehicle data bus 50 also outputs an intake air estimate signal to a measurement model 58. In addition, the vehicle data bus 50 provides gear and RPM signals to a dynamic torque estimator 60.

The steady state torque estimator 54 generates sensitivity signals such as GPO, RPM, spark and spark squared sensitivity signals. The steady state torque estimator 54 also generates an unmanaged engine torque signal. The steady state torque estimator 54 outputs a steady state engine torque signal to the dynamic torque estimator 60. The measurement model 58 also outputs a torque estimate correction signal to the dynamic torque estimator 60. The dynamic torque estimator 60 outputs an actual engine torque signal.

Figure 2:
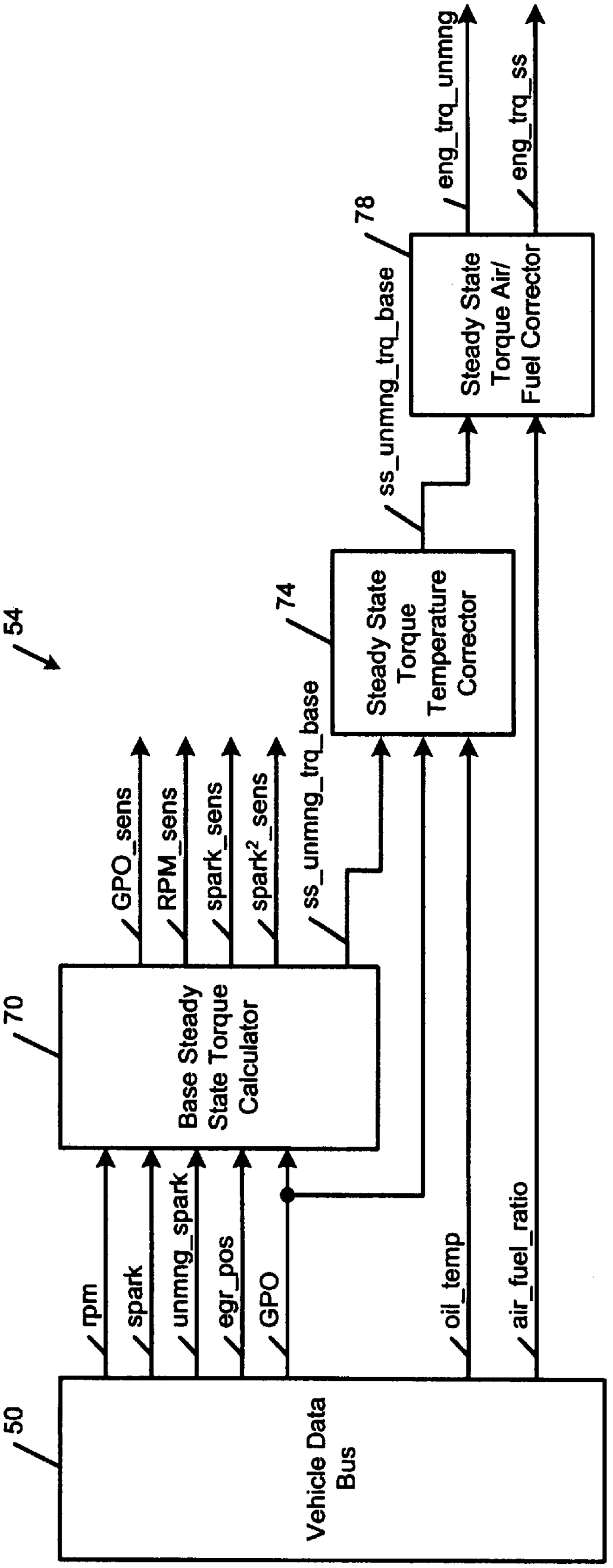
FIG. 2 is a functional block diagram of the steady state torque estimator of FIG. 1 that includes a base steady state torque calculator, a steady state torque temperature corrector, and a steady state torque air/fuel corrector.

Referring now to FIG. 2, the steady state torque estimator 54 is shown in further detail and includes a base steady state torque calculator 70, a steady state torque temperature corrector 74, and a steady state torque air/fuel corrector 78. The base steady state torque calculator 70 receives the RPM, spark, unmanaged spark, EGR position and GPO signals from the vehicle data bus 50. The base steady state torque calculator 70 generates the sensitivity signals including the GPO, RPM, spark, and spark squared sensitivity signals.

The base steady state torque calculator 70 also generates a base unmanaged engine torque signal that is output to the steady state torque temperature corrector 74. The steady state torque temperature corrector 74 receives the oil temperature and air per cylinder signals from the vehicle data bus 50. The steady state torque temperature corrector 74 generates a steady state unmanaged torque base signal that is output to the steady state torque air/fuel corrector 78. The steady state torque air/fuel corrector 78 generates unmanaged engine torque and steady state engine torque signals.

Figure 3:
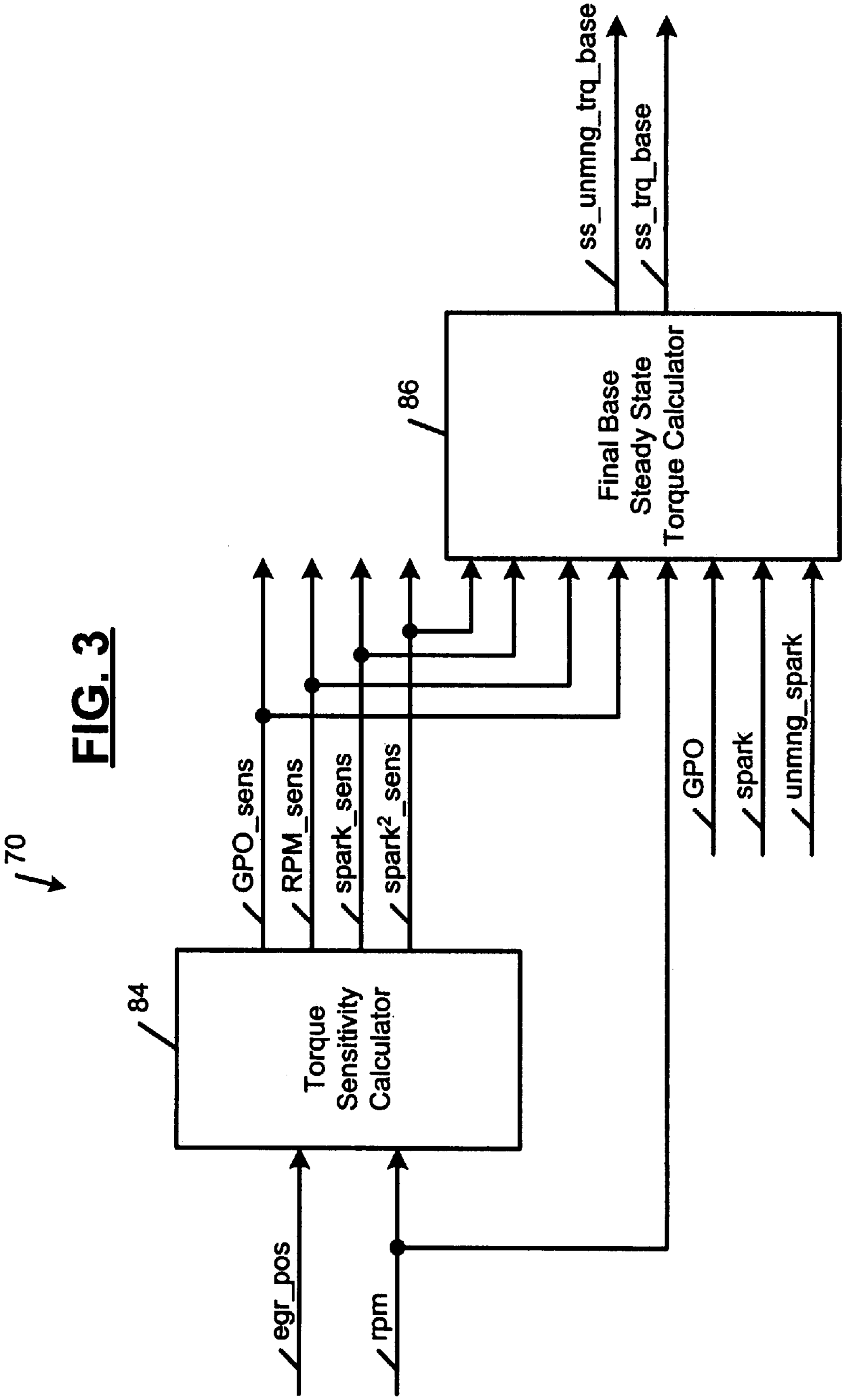
FIG. 3 is a functional block diagram of the base steady state torque calculator of FIG. 2 that includes a torque sensitivity calculator and a final base steady state torque calculator.

Referring now to FIG. 3, the base steady state torque calculator 70 of FIG. 2 is shown in further detail and includes a torque sensitivity calculator 84 and a final base steady state torque calculator 86. The torque sensitivity calculator 84 receives the EGR position and RPM signals and generates the sensitivity signals including the GPO, RPM, spark, and spark squared sensitivity signals. The sensitivity signals are input to the final base steady state torque calculator 86 that also receives the GPO, RPM, spark and unmanaged spark signals from the vehicle data bus 50. The final base steady state torque calculator 86 calculates base steady state unmanaged torque and base steady state torque signals.

Figure 4:
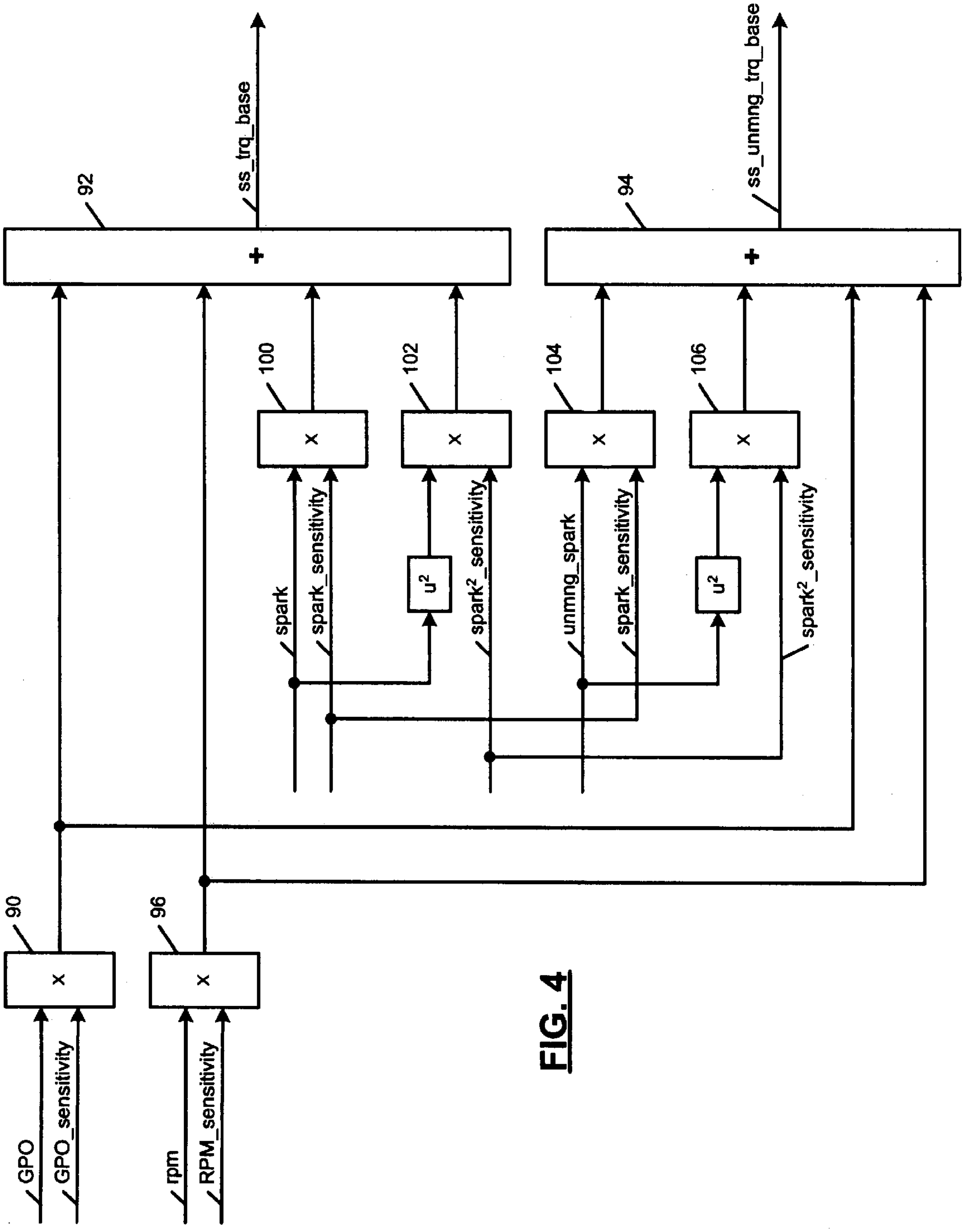
FIG. 4 is a functional block diagram of the final base steady state torque calculator of FIG. 3.

Referring now to FIG. 4, the final base steady state torque calculator 86 is shown in further detail and includes multiplier and adder circuits. A first multiplier 90 multiplies GPO (air per cylinder) and GPO sensitivity signals. An output of the multiplier 90 is input to a first adder 92 and a second adder 94. A second multiplier 96 multiplies RPM and RPM sensitivity signals. An output of the second multiplier 96 is input to the first adder 92 and the second adder 94.

A third multiplier 100 multiplies spark and spark sensitivity signals and outputs the product to the first adder 92. A fourth multiplier 102 multiplies spark squared and spark squared sensitivity signals and outputs the product to the first adder 92. A fifth multiplier 104 multiplies unmanaged spark and spark sensitivity and outputs the product to the second adder 94. A sixth multiplier 106 multiplies unmanaged spark squared and spark squared sensitivity signals and outputs the product to the second adder 94. The first adder 92 outputs the steady state torque base signal. The second adder 94 outputs the base steady state unmanaged torque signal.

Figure 5:
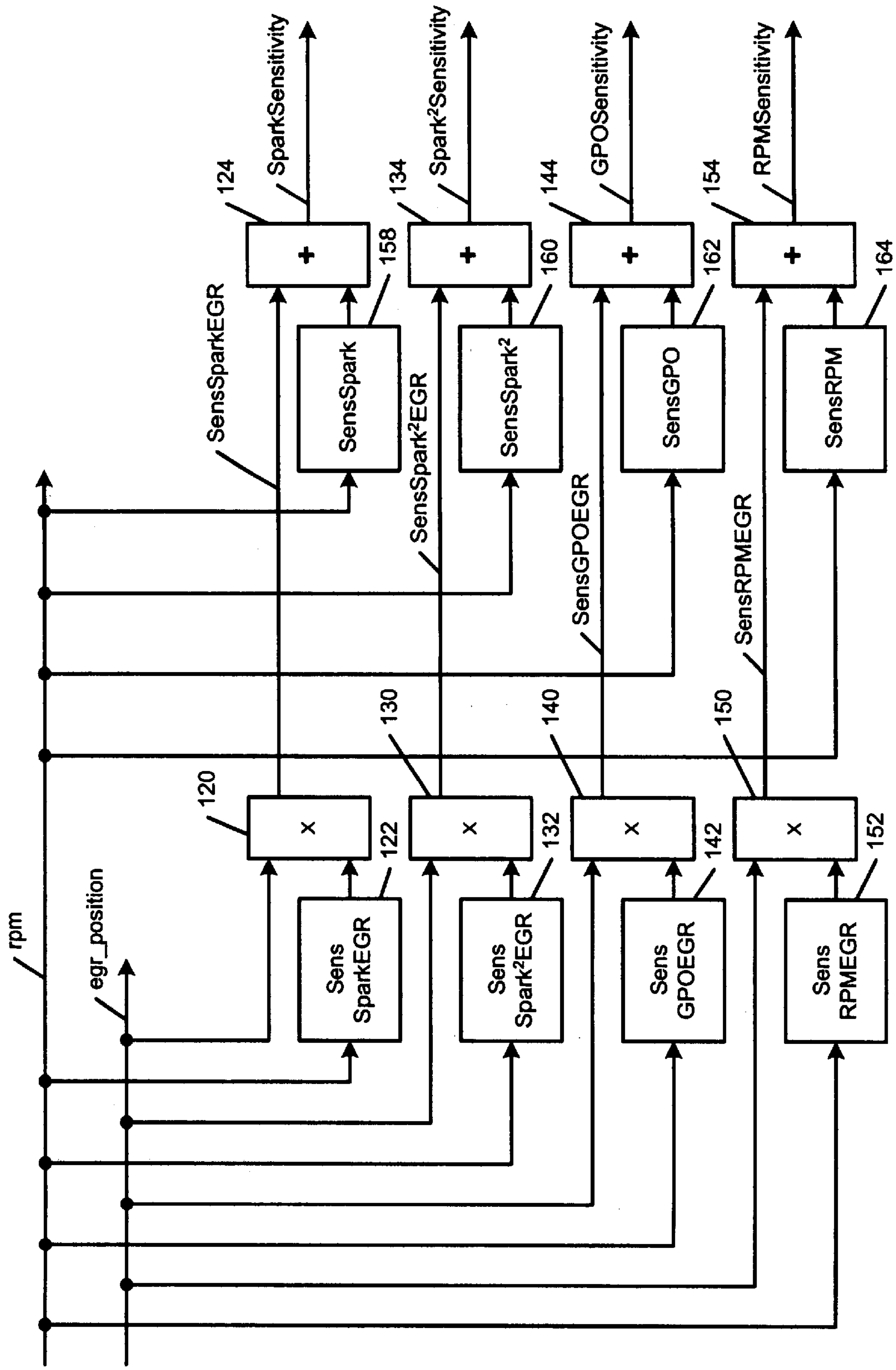
FIG. 5 is a functional block diagram of the torque sensitivity calculator of FIG. 3.

Referring now to FIG. 5, the torque sensitivity calculator 84 is shown in further detail. A first multiplier 120 multiplies EGR position and an output of a spark_EGR sensitivity lookup table (LUT) 122. The LUT 122 is preferably accessed by the RPM signal. The multiplier 120 outputs a spark/EGR sensitivity signal that is input to a first adder 124. A second multiplier 130 multiplies EGR position and an output of a spark squared/EGR sensitivity LUT 132. The LUT 132 is preferably accessed by the RPM signal. The multiplier 130 outputs a spark squad/EGR sensitivity signal that is input to a second adder 134. A third multiplier 140 multiplies EGR position and an output of a GPO_EGR sensitivity LUT 142. The LUT 142 is preferably accessed by the RPM signal. The multiplier 140 outputs a GPO/EGR sensitivity signal that is input to a third adder 144. A fourth multiplier 150 multiplies EGR position and an output of a RPM/EGR sensitivity LUT 152. The LUT 152 is preferably accessed by the RPM signal. The multiplier 150 outputs a GPO/EGR sensitivity signal that is input to a third adder 154.

A spark sensitivity signal is generated by a LUT 158 that is accessed using the RPM signal. The spark sensitivity signal is input to the first adder 124. An output of the first adder 124 is the spark sensitivity signal. A spark squared sensitivity signal is generated by a LUT 160 that is accessed using the RPM signal. The spark squared sensitivity signal is input to the second adder 124. An output of the second adder 134 is the spark squared sensitivity signal. A GPO sensitivity signal is generated by a LUT 162 that is accessed using the RPM signal. The GPO sensitivity signal is input to the third adder 144. An output of the third adder 144 is the GPO sensitivity signal. An RPM sensitivity signal is generated by a LUT 164 that is accessed using the RPM signal. The RPM sensitivity signal is input to the fourth adder 144. An output of the fourth adder 144 is the RPM sensitivity signal.

The present invention enables additional functions that were not provided in prior torque estimation systems. The torque estimation system of the present invention has inputs such as the RPM, exhaust gas recirculation (EGR), spark, and other signals that are needed for engine RPM and torque control (ERTC). The torque estimation system is also able to recalculate inputs based upon requested torque. The torque estimation system also optimizes brake torque.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine torque estimator comprising:

a vehicle data bus that provides a plurality of engine operating inputs including at least one of engine RPM, spark, and dilution estimate signals;

a steady state torque estimator that communicates with said vehicle data bus and that generates a steady state engine torque signal;

a measurement model that communicates with said vehicle data bus and that compensates for errors due to engine manufacturing variations; and a dynamic torque estimator that communicates with at least one of said vehicle data bus, said measurement model, and said steady state torque estimator and that generates an actual torque signal.

2. The engine torque estimator of claim 1 wherein said engine operating inputs further include at least one of air per cylinder, unmanaged spark, oil temperature, air/fuel ratio, barometer, enabled cylinders, and intake air estimate signals.

3. The engine torque estimator of claim 2 wherein said steady state torque estimator generates at least one of a GPO sensitivity signal, an RPM sensitivity signal, a spark sensitivity signal, and a spark squared sensitivity signal.

4. The engine torque estimator of claim 3 wherein said steady state torque estimator further generates an unmanaged engine torque signal.

5. The engine torque estimator of claim 4 wherein said steady state torque estimator outputs a steady state engine torque signal to said dynamic torque estimator.

6. The engine torque estimator of claim 5 wherein said measurement model receives said air intake estimate and outputs a torque estimate correction signal to said steady state torque estimator and wherein said dynamic torque estimator outputs said actual engine torque signal.

7. The engine torque estimator of claim 6 wherein said steady state torque estimator includes a base steady state torque calculator, a steady state torque temperature corrector, and a steady state torque air/fuel corrector.

8. The engine torque estimator of claim 7 wherein said base steady state torque calculator receives said RPM, said spark, said unmanaged spark, said dilution estimate and said GPO signals from said vehicle data bus and generates said GPO, RPM, spark, and spark squared sensitivity signals.

9. The engine torque estimator of claim 8 wherein said base steady state torque calculator generates a base unmanaged engine torque signal that is output to said steady state torque temperature corrector.

10. The engine torque estimator of claim 9 wherein said steady state torque temperature corrector receives said oil temperature and said GPO signals from said vehicle data bus and generates a steady state unmanaged torque base signal that is output to said steady state torque air/fuel corrector.

11. The engine torque estimator of claim 10 wherein said steady state torque air/fuel corrector receives said air/fuel ratio signal and generates unmanaged engine torque and steady state engine torque signals.

12. The engine torque estimator of claim 11 wherein said base steady state torque calculator includes a torque sensitivity calculator and a final base steady state torque calculator.

13. The engine torque estimator of claim 12 wherein said torque sensitivity calculator receives said dilution estimate and RPM signals from said vehicle data bus and generates said GPO, RPM, spark, and spark squared sensitivity signals.

14. The engine torque estimator of claim 13 wherein said sensitivity signals are input to said final base steady state torque calculator and wherein said final base steady state torque calculator receives said GPO, RPM, spark and unmanaged spark signals from said vehicle data bus.

15. The engine torque estimator of claim 14 wherein said final base steady state torque calculator calculates base steady state unmanaged torque and base steady state torque signals.

16. The engine torque estimator of claim 15 wherein said final base steady state torque calculator includes:

a first multiplier that multiplies said GPO signal and said GPO sensitivity signal;

a second multiplier that multiplies said RPM signal and said RPM sensitivity signal;

a third multiplier that multiplies said spark signal and said spark sensitivity signal;

a fourth multiplier that multiplies spark squared and said spark squared sensitivity signal;

a fifth multiplier that multiplies said unmanaged spark signal and said spark sensitivity signal;

a sixth multiplier that multiplies unmanaged spark squared and said spark squared sensitivity signal;

a first adder having an input connected to outputs of said first, second, third and fourth multipliers and an output that generates said base steady state torque signal; and a second adder having an input connected to outputs of said first, second, fifth and sixth multipliers and an output that generates said base steady state unmanaged torque signal.

17. The engine torque estimator of claim 16 wherein said torque sensitivity calculator includes:

a first multiplier that multiplies said dilution estimate signal and an output of a spark/dilution estimate sensitivity lookup table (LUT) that is accessed by said RPM signal to produce a spark/dilution estimate sensitivity signal that is input to a first adder;

a second multiplier that multiplies said dilution estimate signal and an output of a spark squared/dilution estimate sensitivity LUT that is accessed by said RPM signal to produce a spark squared/dilution estimate sensitivity signal that is input to a second adder;

a third multiplier that multiplies said dilution estimate signal and an output of a GPO/dilution estimate sensitivity LUT that is accessed by said RPM signal to produce a GPO/dilution estimate sensitivity signal that is input to a third adder; and a fourth multiplier that multiplies said dilution estimate signal and an output of a RPM/dilution estimate sensitivity LUT that is accessed by said RPM signal to produce a GPO/dilution estimate sensitivity signal that is input to a fourth adder.

18. The engine torque estimator of claim 17 wherein said torque sensitivity calculator includes:

a spark sensitivity LUT, accessed using said RPM signal, that generates a spark sensitivity input to said first adder, wherein said first adder generates said spark sensitivity signal;

a spark squared sensitivity LUT, accessed using said RPM signal, that generates a spark squared sensitivity input to said second adder, wherein said second adder outputs said spark sensitivity squared signal;

a GPO sensitivity LUT, accessed using said RPM signal, that generates a GPO sensitivity input to said third adder, wherein said third adder generates said GPO sensitivity signal; and an RPM sensitivity LUT, accessed using said RPM signal, that generates an RPM sensitivity input to said fourth adder, wherein said fourth adder generates said RPM sensitivity signal.

* * * * *